United States Patent
Abbondanzio et al.

(10) Patent No.: US 7,269,630 B2
(45) Date of Patent: Sep. 11, 2007

(54) AUTOMATICALLY SWITCHING SHARED REMOTE DEVICES IN A DENSE SERVER ENVIRONMENT THEREBY ALLOWING THE REMOTE DEVICES TO FUNCTION AS A LOCAL DEVICE

(75) Inventors: Antonio Abbondanzio, Raleigh, NC (US); Thomas Charles Burke, Durham, NC (US); Gregory William Dake, Durham, NC (US); William Gavin Holland, Cary, NC (US); William Joseph Piazza, Holly Springs, NC (US); Gregory Brian Pruett, Raleigh, NC (US); David B. Rhoades, Apex, NC (US)

(73) Assignee: International Business Machines Corporation, Armonk, NY (US)

( * ) Notice: Subject to any disclaimer, the term of this patent is extended or adjusted under 35 U.S.C. 154(b) by 1059 days.

(21) Appl. No.: 09/981,519

(22) Filed: Oct. 17, 2001

(65) Prior Publication Data
US 2003/0074431 A1  Apr. 17, 2003

(51) Int. Cl.
*G06F 9/46* (2006.01)
*G06F 15/16* (2006.01)
*G06F 15/167* (2006.01)

(52) U.S. Cl. .................. 709/211; 718/104; 709/214
(58) Field of Classification Search .............. 718/1, 718/100–108; 709/200–253
See application file for complete search history.

(56) References Cited

U.S. PATENT DOCUMENTS

| | | | |
|---|---|---|---|
| 4,161,779 A | * | 7/1979 | Spencer et al. ............... 710/41 |
| 4,965,718 A | * | 10/1990 | George et al. ............... 718/104 |
| 5,307,462 A | | 4/1994 | Hastings ..................... 395/275 |
| 5,530,892 A | | 6/1996 | Hwang ........................ 395/822 |
| 5,577,205 A | | 11/1996 | Hwang et al. .......... 395/200.01 |
| 5,630,166 A | * | 5/1997 | Gamache et al. ............. 712/29 |

(Continued)

FOREIGN PATENT DOCUMENTS

JP  11284636  10/1999

(Continued)

OTHER PUBLICATIONS

"Programmable Multi-Host Device Sharing USB Hub," *IBM Disclosure*, Feb. 1999, p. 266.

Primary Examiner—Meng-Al T. An
Assistant Examiner—Kenneth Tang
(74) Attorney, Agent, or Firm—Robert A. Voigt, Jr.; Winstead PC

(57) ABSTRACT

A method, system and computer program product for automatically switching remote shared devices in a dense server environment. A device driver in a server blade may be configured to receive a request to access a shared device from the server blade and issue a query to a service processor as to whether the requested shared device is being accessed. If the requested shared device is not being accessed by the requesting server blade, then the device driver may wait to receive a response from the service processor indicating that the requested shared device is available. Once the requested shared device is available, the service processor may connect the requested shared device with the requesting server blade. The request to access the requested shared device may then be transferred to the requested shared device by the device driver.

22 Claims, 3 Drawing Sheets

U.S. PATENT DOCUMENTS

| | | | |
|---|---|---|---|
| 5,796,984 A | 8/1998 | Pearce et al. | 395/500 |
| 5,819,112 A * | 10/1998 | Kusters | 710/36 |
| 5,854,905 A | 12/1998 | Garney | 395/284 |
| 5,983,012 A | 11/1999 | Bianchi et al. | 395/500.44 |
| 6,006,029 A | 12/1999 | Bianchi et al. | 395/500.45 |
| 6,012,103 A | 1/2000 | Sartore et al. | 710/8 |
| 6,073,188 A | 6/2000 | Fleming | 710/38 |
| 6,098,120 A | 8/2000 | Yaotani | 710/16 |
| 6,141,719 A | 10/2000 | Rafferty et al. | 710/131 |
| 6,363,411 B1 * | 3/2002 | Dugan et al. | 709/202 |
| 6,430,640 B1 * | 8/2002 | Lim | 710/200 |
| 6,446,129 B1 * | 9/2002 | DeForest et al. | 709/230 |
| 6,895,588 B1 * | 5/2005 | Ruberg | 719/321 |
| 6,950,895 B2 * | 9/2005 | Bottom | 710/301 |
| 2002/0122415 A1 * | 9/2002 | Chang et al. | 370/352 |
| 2002/0194412 A1 * | 12/2002 | Bottom | 710/302 |

FOREIGN PATENT DOCUMENTS

| | | |
|---|---|---|
| JP | 2000196648 | 7/2000 |
| JP | 2000276353 | 10/2000 |

* cited by examiner

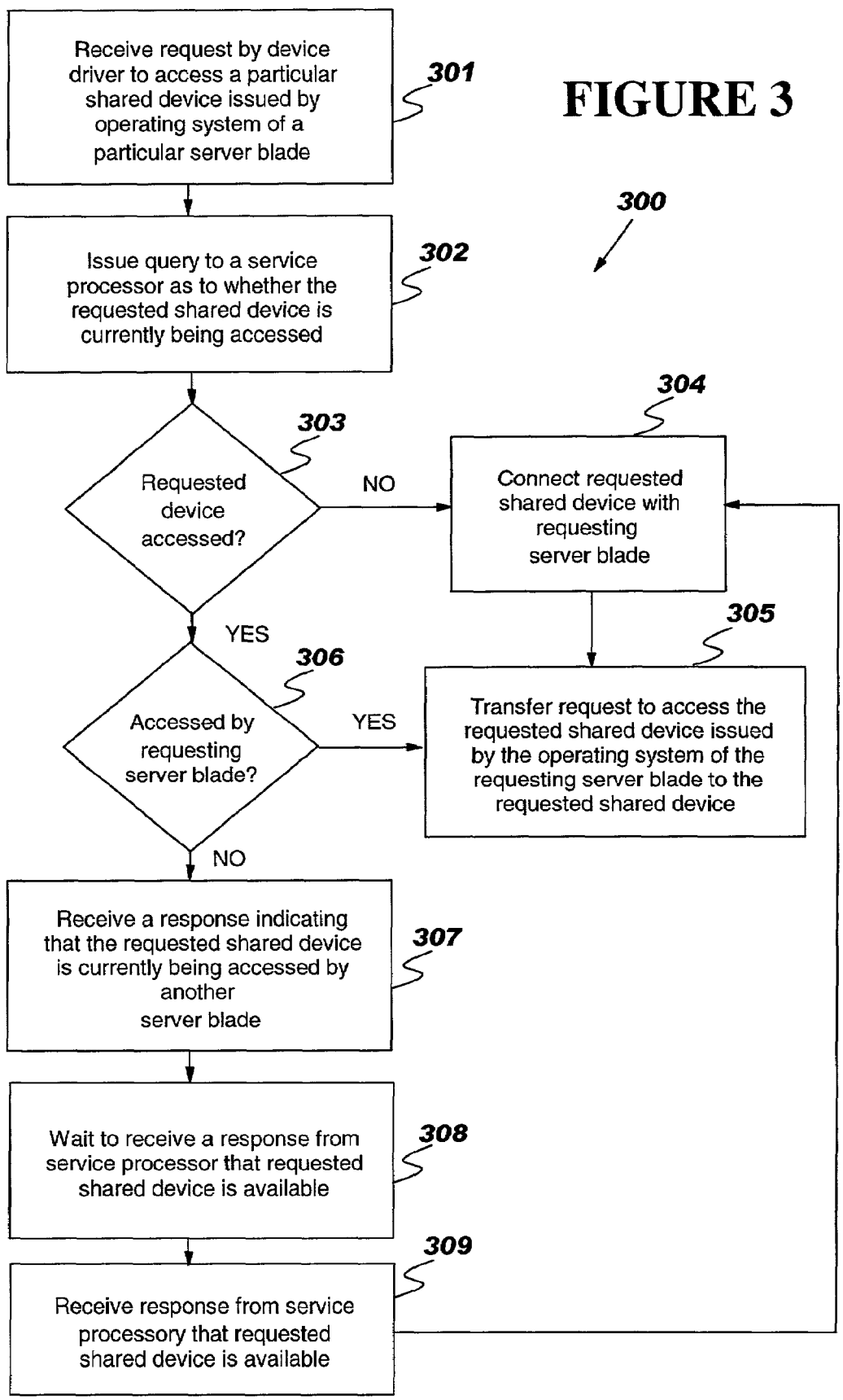

AUTOMATICALLY SWITCHING SHARED REMOTE DEVICES IN A DENSE SERVER ENVIRONMENT THEREBY ALLOWING THE REMOTE DEVICES TO FUNCTION AS A LOCAL DEVICE

TECHNICAL FIELD

The present invention relates to the field of a dense server environment, and more particularly to automatically switching remote devices, e.g., Universal Serial Bus (USB) devices, to particular server blades in a dense server environment thereby allowing each remote device to function as a local device.

BACKGROUND INFORMATION

In a dense server environment, multiple computer systems commonly referred to as server blades may each have the ability to access a shared device, e.g., Universal Serial Bus (USB) device. A server blade may refer to a typical server that does not include a storage unit, e.g., Compact Disc Read Only Memory (CD-ROM) drive, floppy disk drive. The storage unit, e.g., CD-ROM drive, floppy disk drive, may be the shared device that each server blade has the ability to access. Typically, a server blade may access a shared device via a mechanical switch. A button on the mechanical switch may be selected to establish a connection between a server blade and a shared device. The shared device, e.g., CD-ROM drive, floppy disk drive, may then function as a local device, e.g., boot device, thereby allowing the server blade to perform an initial operating system load or to run diagnostics on the server blade. However, having to physically select a button on a mechanical switch to establish a connection between a server blade and a shared device may be cumbersome especially if the server blades are located in a remote area.

In contrast, in a network system environment, a device, e.g., USB device, may be automatically shared among multiple computer systems such as a server blade without the implementation of a mechanical switch. In a network system environment, a shared device, e.g., USB device, may be connected to a server in the network that is shared among multiple computer systems such as a server blade. That is, the shared device, e.g., USB device, may function as a network drive. However, in the network environment, the shared device does not function as a local device thereby not allowing the server blade to use the shared device, e.g., CD-ROM drive, floppy disk drive, as a boot device.

It would therefore be desirable to automatically switch remote devices, e.g., Universal Serial Bus (USB) devices, to particular server blades in a dense server environment thereby allowing each remote shared device to function as a local device without the use of a mechanical switch.

SUMMARY

The problems outlined above may at least in part be solved in some embodiments by a server blade comprising a device driver configured to receive a request to access a particular shared device from the server blade. The device driver may further be configured to issue a query to a service processor as to whether the requested shared device is currently being accessed. The service processor may be configured to connect the requesting server blade with the requested shared device. If the requested shared device is not being accessed by the requesting server blade, then the device driver may wait such as by entering into a pending state to receive a response from the service processor indicating that the requested shared device is available. Once the requested shared device is available, the service processor may connect the requested shared device with the requesting server blade. Upon connecting the requested shared device with the requesting server blade, the request to access the requested shared device may be transferred to the requested shared device by the device driver. Upon transferring the request to the requested shared device, the requested shared device may consequently function as a local device with respect to the requesting server blade.

In one embodiment of the present invention, a method for automatically switching remote devices in a dense server environment may comprise the step of a device driver in a server blade receiving a request to access a shared device from the server blade. Upon receiving such a request, the device driver may issue a query to a service processor to determine whether the requested shared device is currently being accessed. The service processor may be configured to connect the requesting server blade with the requested shared device.

Upon receiving the query to determine whether the requested shared device is currently being accessed, the service processor may determine if the requested device is being accessed. If the requested device is not being accessed, then the service processor may connect the requested shared device with the requesting server blade. Upon connecting the requested shared device with the requesting server blade, the device driver of the requesting server blade may transfer the request to access the requested shared device issued by the requesting server blade to the requested shared device. Upon transferring the request to the requested shared device, the requested shared device may consequently function as a local device with respect to the requesting server blade. That is, the requested shared device, e.g., CD-ROM drive, floppy disk drive, may consequently function as a local device, e.g., boot device, thereby allowing the requesting server blade to use the requested shared device to perform an initial operating system load or to run diagnostics on the requesting server blade.

If the requested device is being accessed, then service processor may determine if the requesting server blade is currently accessing the requested shared device. If the requesting server blade is currently accessing the requested shared device, then the device driver of the requesting server blade may transfer the request to access the requested shared to the requested shared device.

If the requested device is not being accessed by the requesting server blade then the device driver may receive a response from the service processor indicating that the requested shared device is currently unavailable. Upon receiving such a response, the device driver of the requesting server blade may wait such as by entering into a pending state to receive a response from the service processor indicating that the requested shared device is available. By the device driver entering into a pending state, an input/output error may be prevented. That is, the operating system of the requesting server blade may be prevented from receiving an input/output error that the requested shared device is not connected. Once the requested shared device is available, the service processor may connect the requested shared device with the requesting server blade. Upon connecting the requested shared device with the requesting server blade, the request to access the requested shared device may be transferred to the requested shared device by the device driver.

The foregoing has outlined rather broadly the features and technical advantages of one or more embodiments of the present invention in order that the detailed description of the invention that follows may be better understood. Additional features and advantages of the invention will be described hereinafter which form the subject of the claims of the invention.

BRIEF DESCRIPTION OF THE DRAWINGS

A better understanding of the present invention can be obtained when the following detailed description is considered in conjunction with the following drawings, in which:

FIG. 3 is a flowchart of a method for automatically switching remote shared devices in a dense server environment in accordance with the present invention.

DETAILED DESCRIPTION

Figure 1:
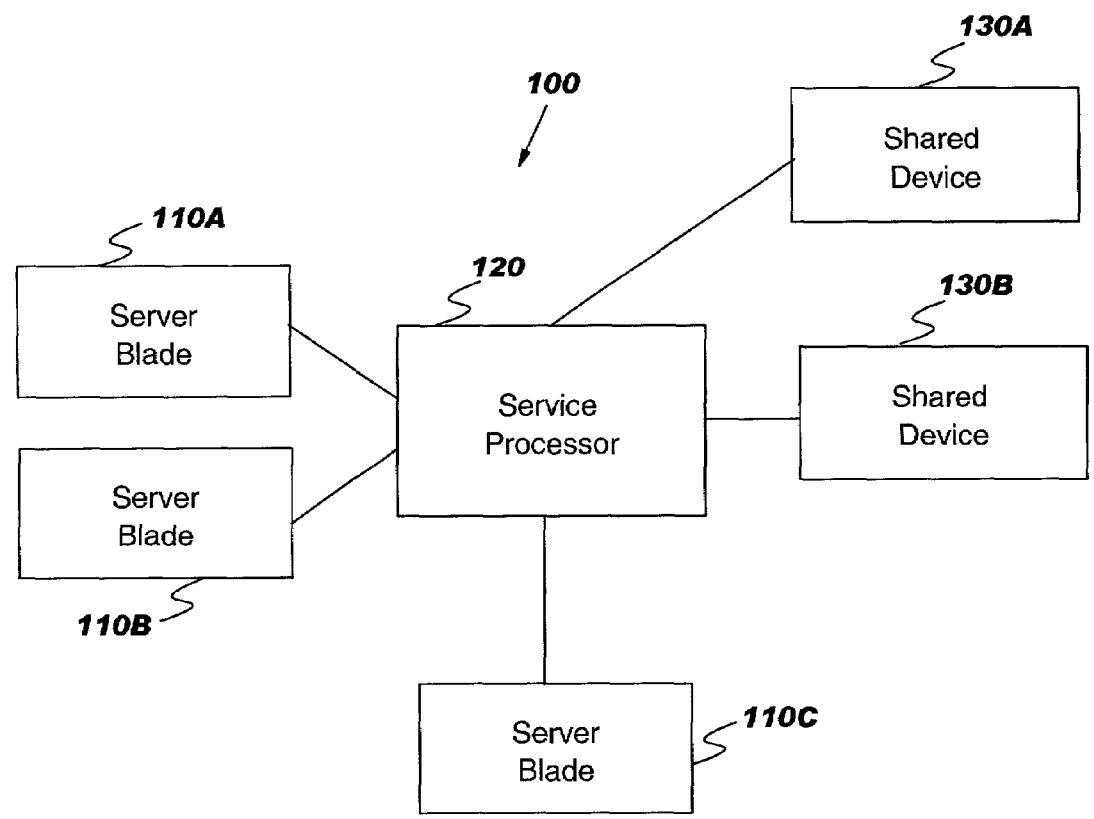
FIG. 1 illustrates a dense server environment configured in accordance with the present invention.

FIG. 1—Dense Server Environment

FIG. 1 illustrates an embodiment of the present invention of a dense server environment 100. Dense server environment 100 may comprise a plurality of server blades 110A-C connected to a service processor 120 which may be connected to one or more shared devices 130A-B, e.g., Universal Serial Bus (USB) devices. Server blades 110A-C may collectively or individually be referred to as server blades 110 or server blade 110, respectively. A detailed description of server blade 110 is provided in the description of FIG. 2. Shared devices 130A-B may collectively or individually be referred to as shared devices 130 or shared device 130, respectively. Each server blade 110 has the ability to access a particular shared device 130 via service processor 120 as explained in greater detail in conjunction with the description of FIG. 4. As stated in the Background Information section, server blade 110 may be a typical server that does not include a storage unit, e.g., CD-ROM drive, floppy disk drive. The storage unit, e.g., CD-ROM drive, floppy disk drive, may be shared devices 130 that each server blade has the ability to access. Service processor 120 may be configured to automatically establish a connection between a particular shared device 130 and a requesting server blade 110 thereby allowing the particular shared device 130 to function as a local device as explained in greater detail in conjunction with the description of FIG. 4. A detailed description of service processor 120 is provided in the description of FIG. 2. It is noted that the connection between server blade 110 and service processor 120 and the connection between service processor 120 and shared device 130 may be any medium type, e.g., wireless, wired. It is further noted that dense server environment 100 may comprise any number of server blades 110, service processors 120 and shared devices 130 and that FIG. 1 is illustrative. It is further noted that dense server environment 100 may be any type of system that has a plurality of server blades 110, a service processor 120 and at least one shared device 130 and that FIG. 1 is not to be limited in scope to any one particular embodiment.

Figure 2:
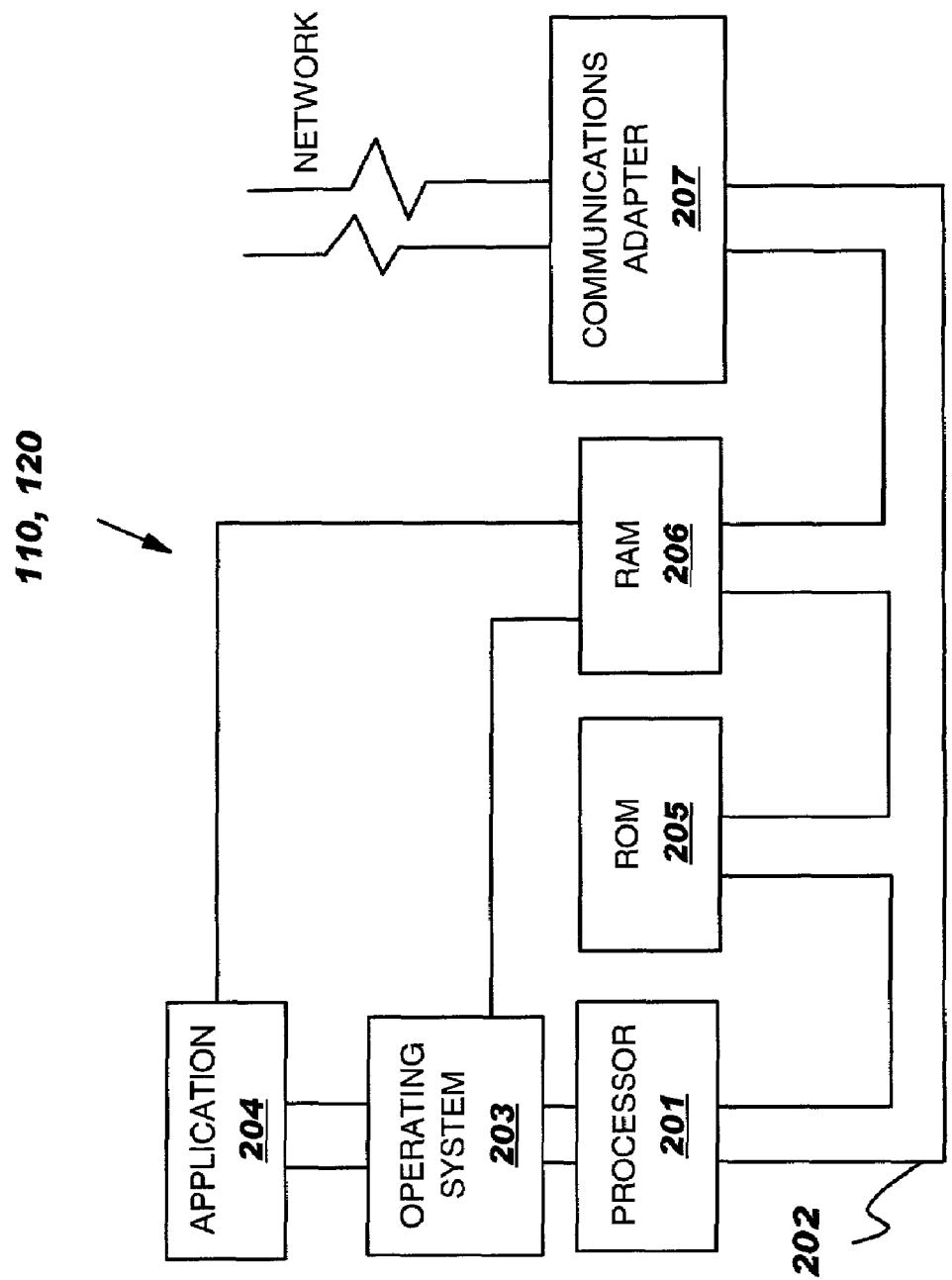
FIG. 2 illustrates an embodiment of the present invention of a server blade and a service processor.

FIG. 2—Hardware Configuration of Server Blade and Service Processor

FIG. 2 illustrates an embodiment of the present invention of server blade 110 and service processor 120. Server blade 110, service processor 120 may comprise a processor 201 coupled to various other components by a system bus 202. An operating system 203 may run on processor 201 and provide control as well as coordinate the function of the various components of FIG. 2. Application 204 in accordance with the principles of the present invention may run in conjunction with operation system 203 and provide calls to operating system 203 where the calls implement the various functions or services to be performed by application 204. Application 204 of server blade 110 may include for example, a device driver for issuing a request to service processor 120 to connect the associated server blade 110 with a particular shared device 130 as well as waiting to receive a request from service processor 120 that the requested shared device 130 is available as described in the description of FIG. 4. Application 204 of service processor 120 may include for example, a program for determining if the requested shared device 130 is being accessed and connecting the requested shared device 130 with the requesting server blade 110 as described in the description of FIG. 4. Read only memory (ROM) 205 may be coupled to system bus 202 and include a basic input/output system ("BIOS") that controls certain basic functions of server blade 110. Random access memory (RAM) 206 and communications adapter 207 may also be coupled to system bus 202. It should be noted that software components including operating system 203 and application 204 may be loaded into RAM 206 which is the server blade's 110 main memory. It is noted that the device driver of the present invention that issues a request to service processor 120 to connect the associated server blade 110 with a particular shared device 130 as well as waiting to receive a request from service processor 120 that the requested shared device 130 is available as described in the description of FIG. 4 may reside in application 204. It is further noted that the program of the present invention that determines if the requested shared device 130 is being accessed and connecting the requested shared device 130 with the requesting server blade 110 as described in the description of FIG. 4 may reside in application 204. Communications adapter 207 of server blade 110 may interconnect bus 202 with a network enabling server blade 110 to communicate with service processor 120 via a Local Area Network (LAN), e.g., Ethernet, Token Ring, ARCnet, or a Wide Area Network (WAN), e.g., Internet. Communications adapter 207 of service processor 120 may interconnect bus 202 with a network enabling service processor 120 to communicate with server blade 110 or shared device 130 via a Local Area Network (LAN), e.g., Ethernet, Token Ring, ARCnet, or a Wide Area Network (WAN), e.g., Internet.

Implementations of the invention include implementations as a computer system programmed to execute the method or methods described herein, and as a computer program product. According to the computer system implementations, sets of instructions for executing the method or methods are resident in the random access memory 206 of one or more computer systems configured generally as described above. Until required by server blade 110, service processor 120, the set of instructions may be stored as a computer program product in another computer memory. Furthermore, the computer program product can also be stored at another computer and transmitted when desired to the user's workstation by a network or by an external network such as the Internet. One skilled in the art would appreciate that the physical storage of the sets of instructions physically changes the medium upon which it is stored so that the medium carries computer readable information. The change may be electrical, magnetic, chemical or some other physical change.

FIG. 3—Method for Automatically Switching Remote Shared Devices in a Dense Server Environment FIG. 3 is a flowchart of one embodiment of the present invention of a method 300 for automatically switching remote shared devices to particular server blades in a dense server environment thereby allowing each remote shared device to function as a local device without the use of a mechanical switch. As stated in the Background Information section, a server blade in a dense server environment may typically access a shared device via a mechanical switch. A button on the mechanical switch may be selected to establish a connection between a server blade and a shared device. However, having to physically select a button on a mechanical switch to establish a connection between a server blade and a shared device may be cumbersome especially if the server blades are located in a remote area. In contrast, in a network system environment, a device may be automatically shared among server blades without the implementation of a mechanical switch. In a network system environment, a shared device may be connected to a server in the network that is shared among multiple computer systems such as a server blade. That is, the shared device may function as a network drive. However, in the network environment, the shared device, e.g., CD-ROM drive, floppy disk drive, does not function as a local device, e.g., boot device, thereby not allowing the server blade to perform an initial operating system load or to run diagnostics on the server blade. It would therefore be desirable to automatically switch remote devices, e.g., Universal Serial Bus (USB) devices, to particular server blades in a dense server environment thereby allowing each remote shared device to function as a local device without the use of a mechanical switch. Method 400 is a method for automatically switching remote shared devices to particular server blades in a dense server environment thereby allowing each remote shared device to function as a local device without the use of a mechanical switch.

In step 301, a device driver of a server blade 110 (FIG. 2) may receive a request to access a shared device 130 (FIG. 1), e.g., USB device, in a dense server environment (FIG. 1) from server blade 110 (FIG. 2). The device driver may receive a request to access shared device 130 from operating system 203 (FIG. 2) of server blade 110.

In step 302, the device driver of server blade 110 may issue a query to service processor 120 (FIG. 2) to determine whether the requested shared device 130 is currently being accessed.

In step 303, service processor 120 may determine if the requested device is being accessed. If the requested device is not being accessed, then service processor 120, in step 304, may connect the requested shared device 130 with server blade 110 that issued the request in step 301. Upon connecting the requested shared device 130 with the requesting server blade 110, the device driver of server blade 110, in step 305, may transfer the request to access shared device 130 received in step 301 to the requested shared device 130. Upon transferring the request to access shared device 130 to the requested shared device 130, the requested shared device 130 may consequently function as a local device to the requesting server blade 110. That is, the requested shared device 130, e.g., CD-ROM drive, floppy disk drive, may consequently function as a local device, e.g., boot device, with respect to the requesting server blade 110 thereby allowing the requesting server blade 110 to perform an initial operating system load or to run diagnostics on the requesting server blade 110.

If the requested device is being accessed, then service processor 120, in step 306, may determine if the requesting server blade 110 is currently accessing the requested shared device 130. If the requesting server blade 110 is currently accessing the requested shared device 130, then the device driver of server blade 110, in step 305, may transfer the request to access shared device received in step 301 to the requested shared device 130.

If the requested device is not being accessed by the requesting server blade 110 then the device driver, in step 307, may receive a response from service processor 120 indicating the requested shared device 130 is currently being accessed by another server blade 110. That is, the device driver, in step 307, may receive a response from service processor 120 indicating that the requested shared device 130 is currently unavailable. Upon receiving the response from service processor 120 indicating that the requested shared device 130 is currently being accessed by another server blade 110, the device driver, in step 308, may wait such as by entering into a pending state to receive a response from service processor 120 that the requested shared device 130 is available. By the device driver entering into a pending state, an input/output error may be prevented. That is, operating system 203 may be prevented from receiving an input/output error that the requested shared device 130 is not connected. By the device driver entering into a pending state, the requested shared device 130 may appear to be functioning as a local device from the perspective of operating system 203 of the requesting server blade 110 upon the requested shared device 130 being connected to the requesting server blade 110 as described below.

In step 309, the device driver may receive a response from service processor 120 that the requested shared device 130 is available. Upon receiving the response from service processor 120 that the requested shared device 130 is available, service processor 120, in step 304, may connect the requested shared device 130 with the requesting server blade 110. Upon connecting the requested shared device 130 with the requesting server blade 110, the device driver of server blade 110, in step 305, may transfer the request to access shared device 130 received in step 301 to the requested shared device 130.

It is noted that method 300 may be executed in a different order presented and that the order presented in the discussion of FIG. 3 is illustrative. It is further noted that certain steps may be executed almost concurrently. It is noted that steps 301-302, 305 and 307-309 may be implemented by the device driver residing in application 204 (FIG. 2) of server blade 110. It is further noted that steps 303-304 and 306 may be implemented by a program in service processor 120 residing in application 204.

Although the system, method and computer program product are described in connection with several embodiments, it is not intended to be limited to the specific forms set forth herein, but on the contrary, it is intended to cover such alternatives, modifications and equivalents, as can be reasonably included within the spirit and scope of the invention as defined by the appended claims. It is noted that the headings are used only for organizational purposes and not meant to limit the scope of the description or claims.

The invention claimed is:

1. A method for automatically switching remote shared devices in a dense server environment comprising the steps of:

receiving a request to access a shared device from a server blade; and issuing a query as to whether said shared device is being accessed by said server blade;

wherein if said shared device is not being accessed by said server blade then the method further comprises the steps of:

receiving a response to said query indicating that said shared device is not available; and waiting to receive a response that said shared device is available.

2. The method as recited in claim 1 further comprising the step of:

determining if said shared device is being accessed.

3. The method as recited in claim 2, wherein if said shared device is not being accessed then the method further comprises the steps of:

connecting said shared device with said server blade; and transferring said request to access said shared device to said shared device.

4. The method as recited in claim 2, wherein if said shared device is being accessed then the method further comprises the step of:

determining if said shared device is being accessed by said server blade.

5. The method as recited in claim 4, wherein if said shared device is being accessed by said server blade then the method further comprises the steps of:

connecting said shared device with said server blade; and transferring said request to access said shared device to said shared device.

6. The method as recited in claim 1 further comprising the steps of:

receiving said response that said shared device is available;

connecting said shared device with said server blade; and transferring said request to access said shared device to said shared device.

7. The method as recited in claim 1, wherein said shared device is a Universal Serial Bus device.

8. A computer program product embodied in a machine readable medium for automatically switching remote shared devices in a dense server environment comprising the programming steps of:

receiving a request to access a shared device from a server blade; and issuing a query as to whether said shared device is being accessed by said server blade;

wherein if said shared device is not being accessed by said server blade then the computer program product further comprises the programming steps of:

receiving a response to said query indicating that said shared device is not available; and waiting to receive a response that said shared device is available.

9. The computer program product as recited in claim 8 further comprises the programming step of:

determining if said shared device is being accessed.

10. The method as recited in claim 9, wherein if said shared device is not being accessed then the computer program product further comprises the programming steps of:

connecting said shared device with said server blade; and transferring said request to access said shared device to said shared device.

11. The computer program product as recited in claim 9, wherein if said shared device is being accessed then the computer program product further comprises the programming step of:

determining if said shared device is being accessed by said server blade.

12. The computer program product as recited in claim 9, wherein if said shared device is being accessed by said server blade then the computer program product further comprises the programming steps of:

connecting said shared device with said server blade; and transferring said request to access said shared device to said shared device.

13. The computer program product as recited in claim 8 further comprises the programming steps of:

receiving said response that said shared device is available;

connecting said shared device with said server blade; and transferring said request to access said shared device to said shared device.

14. The computer program product as recited in claim 8, wherein said shared device is a Universal Serial Bus device.

15. A system, comprising:

one or more shared devices; and a plurality of server blades coupled to said one or more shared devices via a service unit, wherein said service unit is configured to establish a connection between one of said one or more shared devices and one of said plurality of server blades requesting to access said one of said one or more shared devices;

wherein said requesting server blade comprises:

a processor; and a memory unit coupled to said processor, wherein said memory unit is operable for storing a program, wherein the program is operable for performing the following programming steps:

receiving a request to access said requested shared device from said requesting server blade; and issuing a query to said service unit as to whether said requested shared device is being accessed by said server blade;

wherein if said requested shared device is not being accessed by said requesting server blade then the program is further operable for performing the following programming steps:

receiving a response to said query indicating that said requested shared device is not available; and waiting to receive a response that said requested shared device is available.

16. The system as recited in claim 15, wherein said service unit comprises:

a processor; and a memory unit coupled to said processor, wherein said memory unit is operable for storing a computer program, wherein the computer program is operable for performing the following programming step:

determining if said requested shared device is being accessed.

17. The system as recited in claim 16, wherein if said requested shared device is not being accessed then the computer program of said service unit is further operable for performing the following programming step:

connecting said requested shared device with said requesting server blade;

wherein if said requested shared device is not being accessed then the program of said requesting server blade is further operable for performing the following programming step:

transferring said request to access said requested shared device to said requested shared device.

18. The system as recited in claim 16, wherein if said requested shared device is being accessed then the computer program of said service unit is further operable for performing the following programming step:

determining if said requested shared device is being accessed by said requesting server blade.

19. The system as recited in claim 18, wherein if said requested shared device is being accessed by said requesting server blade then the computer program of said service unit is further operable for performing the following programming step:

connecting said requested shared device with said requesting server blade;

wherein if said requested shared device is being accessed by said requesting server blade then the program of said requesting server blade is further operable for performing the following programming step:

transferring said request to access said requested shared device to said requested shared device.

20. The system as recited in claim 15, wherein the program of said requesting server blade is further operable for performing the following programming step:

receiving said response that said requested shared devices is available.

21. The system as recited in claim 20, wherein the computer program of said service unit is further operable for performing the following programming step:

connecting said requested shared device with said requesting server blade;

wherein the program of said requesting server blade is further operable for performing the following programming step:

transferring said request to access said requested shared device to said requested shard device.

22. The system as recited in claim 15, wherein said requested shared device is a Universal Serial Bus device.

* * * * *